INVENTOR.
WILLIAM E. CRAWFORD
AND REIMAR C. F. KURTZE
BY
ATTORNEY.

Patented Dec. 10, 1929

1,739,063

UNITED STATES PATENT OFFICE

WILLIAM E. CRAWFORD, OF WAUWATOSA, AND REIMAR C. F. KURTZE, OF MILWAUKEE, WISCONSIN, ASSIGNORS TO A. O. SMITH CORPORATION, OF MILWAUKEE, WISCONSIN, A CORPORATION OF NEW YORK

ELECTRIC RESISTANCE WELDING OF PIPE

Application filed March 12, 1928. Serial No. 261,026.

Our invention relates to a method of welding the longitudinal seams of pipe, in which the resistance to the passage of the electrical current through the edges to be welded is utilized to produce a state of welding fusion in such edges, so that their complete coalescence and union is effected when pressure is applied to bring the heated edges together.

The object of the invention is to improve the present methods of welding, so that the same can be applied to the production of straight-seam, sheet metal pipe, which is the primary purpose of the invention. Such pipe has not heretofore been produced, on account of the imperfections of the existing methods of welding. The difficulty lies in the inability to attain a proper and uniform heated state in the edges to be welded. This is due to the inability to secure such a uniform contact between the edges as will insure the flow of an electrical current of uniform value, from which it has resulted that in some sections of the pipe the edges are heated to a less degree than in other sections, and an imperfect joint, lacking uniformity, has been produced. This failure to produce a uniform contact between the welding edges results from the physical irregularities caused by the inability to provide perfectly straight edges. As a consequence, the contacts occur at irregular spaced intervals thus forming an imperfect seam. The rigidity and thickness of the walls does not permit sufficient flexibility to cause uniform contact under welding pressure as in the case of thin-walled tubes.

Our invention resides in the peculiar formation of one of the edges, whereby a perfect contact with the other edge in the area to be welded is assured, so that a flow of current of uniform value is effected, and consequently, uniform heating is attained. We secure the results desired by serrating transversely one of the edges of the sheet, said transverse serrations being perpendicular to the plane of the sheet, so as to produce contacts at spaced points when the edges are brought together under pressure. The contacts thus made establish a flow of the current across the line of the weld that is of the same value in every part. As the contacting points become heated in their resistance to the passage of the current, such points become softened, and the heat spreads so as to affect in like manner the portions intermediate the points and thus causing the next succeeding projection to contact with the opposite welding edge. In the same operation, the metal of the other edge is fused to a welding state by the passage of the electrical current. Meanwhile, the pressure to bring the heated edges together is increased, until the edges coalesce throughout their meeting line and the welding is completed.

The increased pressure extrudes the metal oxides and impurities from the welding line and provides a weld of the pure parent stock. The shape of the serrations materially aids in this extrusion of impurities since by making the serrations perpendicular to the plane of the sheet the minimum distance for extrusion is provided and less pressure is necessary to extrude the oxides and impurities from the weld.

In practicing our method, we effect the heating and welding progressively of the length of the pipe, in successive sections of the latter, the pipe being made to travel continuously through a welding machine, which latter is equipped with suitable electrodes for supplying the heating current, as well as with pressure devices which operate to progressively bring the edges into the required contact, in the movement of the pipe through the welding machine.

Having thus outlined the nature of our invention, and its advantages over the older methods, we will now describe the manner of its application, and in the appended claims we set forth the features of novelty residing in the invention.

Figure 1:
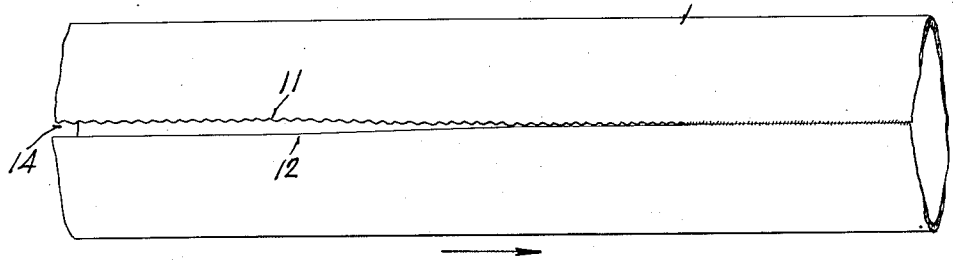
Figure 1 is a top view of a section of pipe, produced and partly welded in accordance with our invention.
Figure 2:
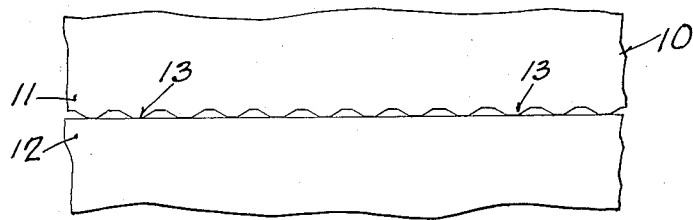
Fig. 2 is an enlarged view of a portion of the top of a pipe, or it may be two flat plates, showing the formation of the meeting edges.
Figure 3:
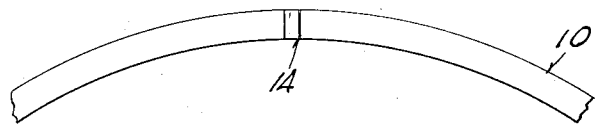
Fig. 3 is an end view of a portion of a pipe in its unwelded condition.
Figure 4:
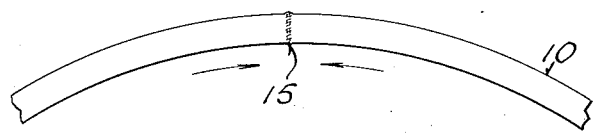
Fig. 4 is a like view of a portion of the pipe after it has been welded.

In the drawing, the numeral 10 indicates a section of a length of pipe, produced by rolling, pressing or otherwise converting a sheet of metal into tubular form. The length of the sheet will be equal to that of the length of the pipe to be produced, and its width will be equal to the circumference thereof, if the pipe be made from a single sheet. In the converting operation, the side or longitudinal edges 11 and 12 of the sheet will be brought into alignment to permit their being welded together to complete the cylindrical structure.

For the purpose of securing a good electrical contact between the meeting edges of the sheet, we serrate transversely one of its edges, the edge 11 in the drawing, so as to produce projections 13, which extend perpendicular through the plane of the sheet. The projections 13, preferably are spaced equal distances apart for the length of the pipe, and these projections 13, in successive sections of the pipe, are brought into engagement, progressively, with the other edge 12. The latter edge may be serrated, if desired.

Normally, that is, prior to welding, the edges 11 and 12 are slightly separated, as at 14, but are brought into contact in the welding operation. Such separation may be provided for in the conversion of the sheet into tubular form, or in such conversion the edges may be brought into abutting relation, and their separation be effected by certain instrumentalities present in the welding machine. The direction of movement of the tube through the welding machine is indicated by the arrow shown in connection with Fig. 1.

A guiding fin or plate, supported in the welding machine, is positioned so as to enter the separation between the meeting edges of the tube in the travel of the latter, and maintain the tube against rotation or other displacement which would disturb the registry of the edges to be welded in their alignment with relation to the electrodes by which they are heated.

In the welding machine, the tube is firmly supported at its lower side, and its lateral sides are subject to opposed pressures which close the separation between the meeting edges and effect the electrical contact of such edges. The laterally exerted pressures are variable, they increasing as the heating of the edges proceeds, so that in the final pressure, the fused edges are positively pressed together to weld them together, as at 15, and constitute an integral structure of pipe. As before stated, the welding is effected progressively during the travel of the pipe through the welding machine.

The separation of the edges before referred to is incidental to the operation of the welding machine in which the pipe is produced. Such a machine is disclosed in our application Serial No. 261,024, filed concurrently, to which reference may be had for information as to details of its construction and operation. The said machine is designed for operation at a high rate of speed, which will permit quantity production of straight-seam, electrically welded sheet metal pipe of the present type, in excessive lengths, with the utmost expedition.

Having thus described our invention, what we claim and desire to secure by Letters Patent of the United States, is:

1. The method of manufacturing electrically welded pipe which comprises providing spaced projections extending perpendicularly across a side edge of a flat metal strip to facilitate extrusion of impurities from the weld, converting said strip into tubular form with the side edges thereof providing a longitudinal seam to be welded, progressively bringing said side edges into contact under pressure and passing an electric current across the same to heat the edges, and applying increased pressure to the edges to weld the same together and extrude oxides and impurities from the weld.

2. The method of manufacturing electrically welded pipe which comprises providing spaced projections on a side edge of a flat metal strip to facilitate extrusion of impurities from the weld, converting said strip into tubular form with the side edges providing a longitudinal seam to be welded, progressively bringing said side edges into contact under pressure and heating the same by means of an electric current, and thereafter progressively applying increased pressure to the edges to weld the same together and extrude oxides and impurties from the weld.

In testimony whereof, we have signed our names at Milwaukee, this 9th day of March, 1928.

WILLIAM E. CRAWFORD.
REIMAR C. F. KURTZE.